W. F. LEBZELTER.
ELECTRIC HEATING DEVICE.
APPLICATION FILED SEPT. 3, 1921.

1,423,806.

Patented July 25, 1922.

WITNESS:
Rob R Ketchel

INVENTOR
William F. Lebzelter
BY
Frank L Busser
ATTORNEY.

UNITED STATES PATENT OFFICE.

WILLIAM F. LEBZELTER, OF ELIZABETHTOWN, PENNSYLVANIA, ASSIGNOR, BY MESNE ASSIGNMENTS, TO EARL M. MILLER, OF ELIZABETHTOWN, PENNSYLVANIA.

ELECTRIC HEATING DEVICE.

1,423,806.      Specification of Letters Patent.      Patented July 25, 1922.

Application filed September 3, 1921. Serial No. 498,262.

*To all whom it may concern:*

Be it known that I, WILLIAM F. LEBZELTER, a citizen of the United States, residing at Elizabethtown, county of Lancaster, and State of Pennsylvania, have invented a new and useful Improvement in Electric Heating Devices, of which the following is a full, clear, and exact description, reference being had to the accompanying drawings, which form a part of this specification.

My invention relates to electric heating devices as stoves, toasters, etc.

The object of my invention is to provide an electric heating device, and more especially an electric toaster, which will be of simplified construction enabling decreased manufacturing costs and which at the same time will be of increased efficiency in operation.

More particularly, by virtue of my invention, I provide greatly simplified means for supporting and supplying current to the resistance elements within the body of the toaster.

Having now indicated in a general way the nature and purpose of my invention, I will proceed to a detailed description thereof with reference to the accompanying drawings, in which I have illustrated the invention as embodied in an electric toaster, and in which—

The body $a$ of the toaster is provided with a perforated top plate $b$ and a perforated bottom plate $c$. The body is supported on legs $d$ positioned beneath the corners and secured to the body by means of bolts $e$ which pass through the bottom and top plates and serve to secure them to the body.

Within the body and at opposite sides thereof are secured a pair of supports $f, f'$ of insulating materials, the supports being secured to the body by means of bolts $g$ which also pass through handles $h$ and secure them to the body.

Opposite faces of the supports are channelled horizontally, as at $i$, for the reception of the sides of a tray $j$ inserted into the body through an aperture $k$ in the front and adapted for the support of the article to be toasted, as a piece of bread.

Figure 1:
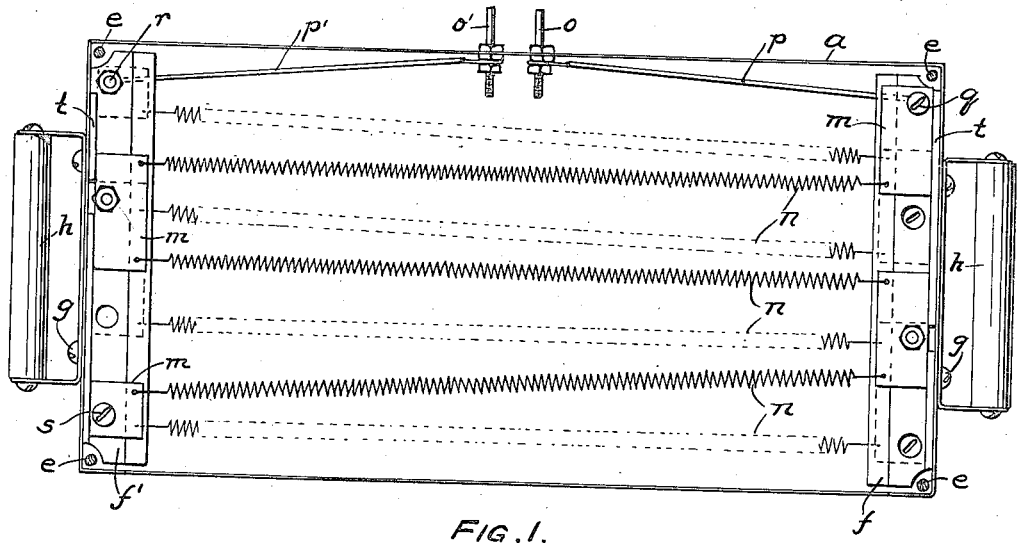
Fig. 1 is a plan view of an electric toaster embodying my invention with the top plate removed.
Figure 2:
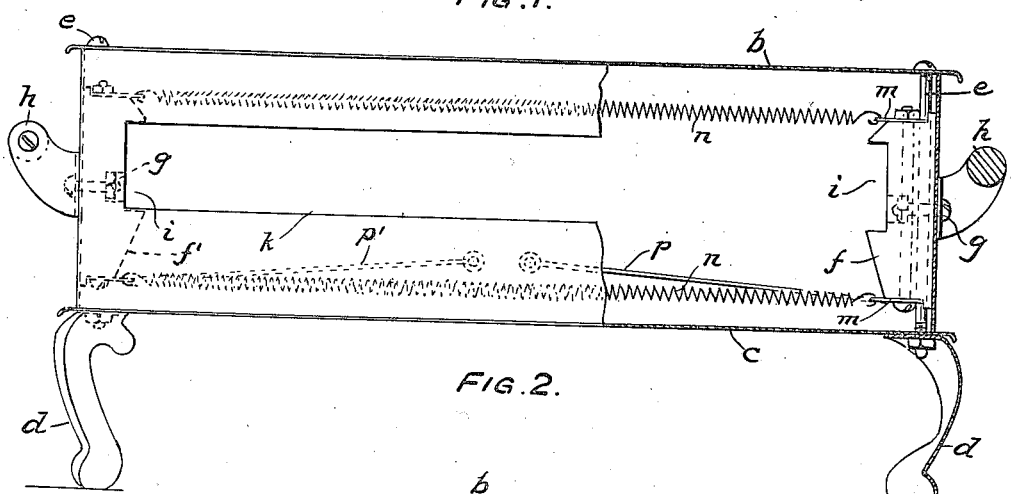
Fig. 2 is a front elevation of the toaster, partly broken away.
Figure 3:
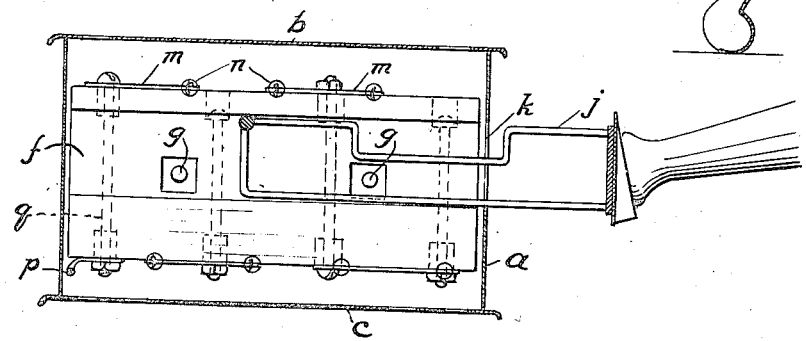
Fig. 3 is a cross-sectional view.

Bus bars $m$ having holes in the edges are secured to the top and bottom of the supports $f, f'$, and coiled resistance wires $n$, having their ends hooked for engagement in the holes in the edges of the bus bars, extend between the bus bars. The supports are provided with protecting flanges $t$, above and below, against which the bus bars bear and which serve to insulate them from the body and to align them, as shown in Figure 1.

Contacts $o, o'$ insulated from the body are carried thereby and are connected by wires $p, p'$ to bolts $q$ and $r$ respectively. The bolt $q$ extends vertically through the support $f$ into contact with one of the bus bars on the top of support $f$ and secures it thereto, while the bolt $r$ serves to secure one of the bus bars to the under side of support $f'$. The bus bars and resistance wires are so connected that the current entering at (say) contact $o$ will pass through bolt $q$ into the first bus bar on the top of support $f$, across the first resistance wire to the first bus bar on top of support $f'$, through this bus bar to the second resistance wire and back and forth until it reaches the last bus bar on top of support $f'$ from which it will pass through a bolt $s$, which extends vertically through support $f'$ and contacts with a bus bar on the under side of support $f''$. The current then passes back and forth through the resistance wires connecting the bus bars on the under side of supports $f$ and $f'$ until it finally passes out through wire $p'$ and contact $o'$.

It will now be obvious that in accordance with my invention a toaster is provided the top, bottom, body and legs of which are secured together by means of four bolts extending through the body at its corners, while the resistance elements are connected by means of bus bars supported on a pair of unitary supports which serve also to support the tray adapted to carry the article to be toasted, and the securing means for which serve to secure the handles to the tray.

It will be noted that the current is transmitted from the upper resistance elements to the lower by means of securing bolts for opposite bus bars, without the necessity for excess wiring.

It will be understood that although I have described my invention particularly in connection with an electric toaster, I do not limit myself to such an embodiment as it is obvious that the invention is equally applicable to any other form of electric heating device as a stove, heater, etc.

Having now fully described my invention what I claim and desire to protect by Letters Patent is:

1. An electric heating device comprising, in combination, a body, oppositely disposed supports secured within the body, bus bars secured to the top and bottom of said supports, resistance elements extending between said supports in contact with said bus bars on the top and bottom of said supports respectively, and means serving to secure a bus bar on the top and bottom of one of said supports and adapted to transmit current through said support from one of said last mentioned bus bars to the other.

2. An electric heating device comprising, in combination, a body, oppositely disposed supports secured within the body, bus bars secured to the top and bottom of said supports, resistance elements extending horizontally between the supports and affording connection between the bus bars on the top and bottom of the supports respectively, and means extending through the supports adapted to transmit current from the top to the bottom of the supports.

3. An electric heating device comprising, in combination, a body, oppositely disposed supports secured within the body, opposing faces of said supports being channelled horizontally, bus bars secured to the top and bottom of said supports, resistance elements extending between the supports in contact with the bus bars on the top and bottom of the supports respectively, and a tray the sides of which are adapted for insertion into the channels in said supports whereby said tray will be supported within the body.

4. An electric heating device comprising, in combination, a body, top and bottom plates, legs, and means extending vertically through the interior of said body and engaging said top and bottom plates and legs whereby said top and bottom plates and legs are secured to said body.

5. An electric heating device comprising, in combination, a body, top and bottom plates, legs, means extending within said body and engaging said top and bottom plates and legs whereby said top and bottom plates and legs are secured to said body, a support adapted to be secured within the body, a handle adapted to be secured outside of the body, and means engaging said handle and extending into said body and engaging said support adapted to secure said handle and support to said body.

In testimony of which invention, I have hereunto set my hand, at Elizabethtown, on this 31st day of August, 1921.

WILLIAM F. LEBZELTER.